Oct. 21, 1958 T. G. MYERS 2,857,181
SUBMERSIBLE APPARATUS
Original Filed June 1, 1949

INVENTOR.
THOMAS G. MYERS,
BY John Flam
ATTORNEY.

United States Patent Office 2,857,181
Patented Oct. 21, 1958

2,857,181

SUBMERSIBLE APPARATUS

Thomas G. Myers, Los Angeles, Calif., assignor to U. S. Electrical Motors, Inc., Los Angeles, Calif., a corporation of California Application July 1, 1949, Serial No. 102,536, which is a division of application Serial No. 453,126, July 31, 1942. Divided and this application January 19, 1953, Serial No. 340,525

8 Claims. (Cl. 286—7)

This invention relates to submersible structures, such as submersible electric motors adapted to be lowered in a well for driving a pump directly connected to the motor.

This application is a division of an application of Thomas G. Myers, Serial No. 102,536, filed July 1, 1949, now abandoned, for "Submersible Apparatus," which application was a divisional application of an abandoned application of Thomas G. Myers, Serial No. 453,126, filed July 31, 1942, for "Submersible Structure." Said last mentioned abandoned application was a continuation-in-part of an application filed in the name of Thomas G. Myers on November 8, 1937, Serial No. 173,434, entitled "Submersible Structure," now Patent No. 2,318,181.

Usually the material pumped from the well is of such character as to be harmful to the motor should it enter into the motor casing. For example, when water is pumped, it should be kept away from the windings and contacting parts, so as not to cause electrical circuits to be improperly established, that would disable the motor. Also, such liquids usually carry grit, sand or other foreign matter that would quickly ruin the bearings inside of the motor. Accordingly, it is of considerable importance to segregate the casing interior as completely as possible from the liquid in which it is submerged.

It is one of the objects of this invention to make it possible, in a simple and effective manner, to insure against entry of the external liquid to the operating parts of the motor.

It has been proposed in the past to provide rotary seals of various kinds to effect this result, the seals being disposed around the shaft that necessarily must extend out of the motor casing. However, since the motor casing is subjected to varying liquid pressure, dependent upon the depth at which it is submerged, these ordinary seals have been found quite inadequate. It is another object of this invention to provide a multiple seal effect, to insure to a greater degree against failure of the seal.

It is still another object of this invention to improve, in general, seals embodying relatively rotatable members.

It is another object of this invention to provide an improved liquid seal that operates in conjunction with a seal provided by rotating contacting surfaces. For this purpose, the liquid overlaps and extends above the area of contact of the rotating surfaces. The sealing liquid is mercury, and in one form of the invention, at least one of the rotating members providing a sealing surface is of a metal that forms an amalgam. Accordingly, at least one of the surfaces forms an amalgam with the mercury and acts to smooth out any irregularities that might have resulted from wear. It is thus ensured that there is effective sealing relationship between the relatively rotating surfaces even after continued use.

In another form of the invention, the materials forming the relatively rotating surfaces are chosen for durability and smoothness. In this instance, the contacting surfaces are made of bronze or steel hardened, as by carburizing. The steel may further be hardened, as by nitriding. In still another form of the invention, chromium plated surfaces are used.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
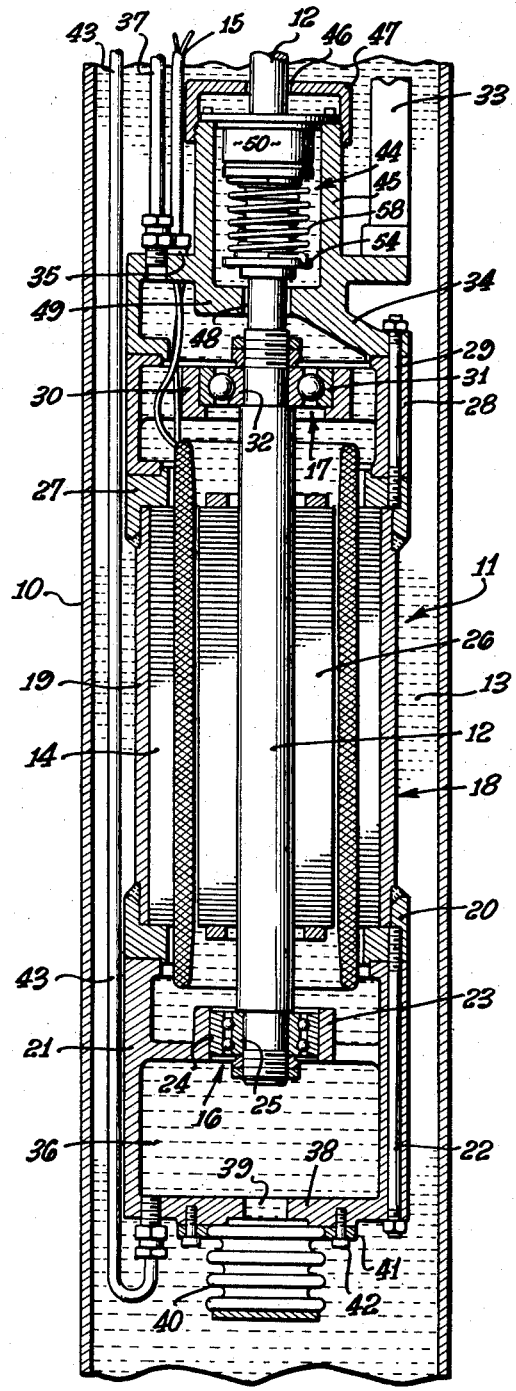
Figure 1 is a view, mainly in longitudinal section, of a structure embodying the invention, shown as submerged in a well casing.

The general character of the submersible structure is illustrated to best advantage in Fig. 1, wherein a well casing 10 has a submersible electric motor 11 disposed therein. This motor has an upwardly extending drive shaft 12, adapted to be connected, for example, to a pump (not shown) for pumping liquid from the well. The motor is shown as submerged in the well liquid 13, which is usually water.

The motor is most conveniently an induction motor of the squirrel cage type having primary or stator windings 14. These windings are adapted to be connected to a suitable source of power at the top of the well by means of a cable 15.

Since the liquid carries foreign particles or dirt, the bearings 16, 17 supporting the shaft 12 must be protected from this liquid. Furthermore, the windings 14 of the motor must also be kept separate from this liquid; otherwise the motor would be quickly disabled.

In order to secure these results, a casing structure 18 is provided, which is so arranged that the well liquid is excluded from the parts that need to be protected for all conditions of operation as regards well pressure, level of the liquid, etc. This casing structure is shown as formed by a cylindrical body 19 within which the stator 14 is supported. Secured to the lower end of the body 19, as by welding, is a lower collar 20, to which is fastened a bearing supporting housing 21, as by a series of threaded studs 22. The housing 21 provides a stationary collar 23 for supporting the outer race 24 of a radial ball bearing structure 16, the inner race 25 of which is secured on the shaft 12. The rotor laminations 26 are mounted on the shaft 12, as is well understood. Since the body 19 may be made from standard pipe, it is a simple matter to provide a body of the correct length for the rating of the particular motor involved.

An upper collar 27 is secured to the top of the body 19, as by welding, and has an upper bearing housing 28 secured thereto, as by studs 29, in a manner similar to that in which the lower bearing housing 21 is secured to the lower collar 20. The housing 28 provides an axially extending boss 30 serving to support the outer race 31 of a radial and thrust ball bearing structure 17, the inner race 32 of which is mounted on the shaft 12.

The shaft 12 extends upwardly beyond the bearing 17 for connection with a pump, not shown. The pump may be connected mechanically to the casing 18 of the motor 11, as by the aid of a foot structure 33, supported upon the head member 34, which is fastened to the upper housing 28. The shaft 12 passes through the head 34 out of the casing structure, and it is apparent that precautions must be taken to prevent entry of liquid around the rotating shaft 12 at this place. The manner in which this is accomplished will be described shortly.

The cable 15 extends through a coupling member 35 in fluid tight relation with the top of the head 34, leading the connections from the windings 14 upwardly out of the casing structure 18.

It is preferred to have a filling of inert, lubricating liquid 36 within the casing structure. For this purpose lubricating oil is convenient, although other suitable liquids may be used. The liquid filling 36 in the casing may be replenished as desired, for example, by means of a supply pipe 37 connected to a passageway through the head member 34. The pipe may lead to the top of the well for connection to a source of the liquid under suitable pressure.

It is advantageous that liquid pressure inside the casing structure 18 be closely controlled. In this way, there is an assurance that the sealing means provided for the shaft 12 will not be subjected to any undue pressure differential. Substantial equalization of pressure between the liquid filling 36 in the motor casing and the exterior liquid 13 is secured by the aid of a structure now to be described. Thus, the bearing housing 21 has an extension. This extension is provided with a bottom flange 38 having a through aperture 39. This aperture is in communication with the interior of a metal bellows 40 extending downwardly from the flange 38. This metal bellows is placed in fluid tight connection with the flange 38, as by the aid of the flange 41 and screws 42. It is apparent that the pressure of the oil 36 within the casing 18 tends to expand the bellows 40 and the pressure of the water 13 outside of the casing tends to contract the bellows. Any variation in pressure, therefore, that would tend to arise, such as that due to temperature variation within the casing, would be equalized by operation of the bellows 40.

Since the interior of the casing 18 is closed at the bottom by the metal bellows 40, the renewal of the oil within the casing by withdrawal of the old oil, is accomplished by providing an emptying pipe 43 for the oil connected to the bottom of the casing, as by being in communication with the interior of the bearing housing extension 21. When it is desired to replace the old oil, therefore, a circulation is provided by the aid of appropriate pumping mechanism at the top of the well to force oil downwardly through the pipe 37 and to remove it through the pipe 43.

Figure 2:
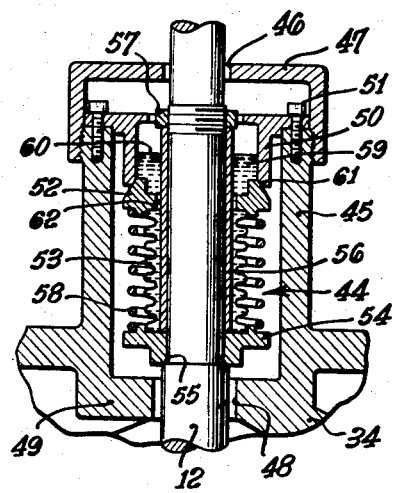
Fig. 2 is an enlarged fragmentary sectional view of the structure shown in Fig. 1 and particularly showing the construction of the seal for the submersible structure.

The upper seal 44 around the rotary shaft 12 is housed, in this instance, within a tubular extension 45, shown as formed integrally with the head 34. The shaft 12 passes through a clearance aperture 46 located in the top of a collar 47 threaded over the extension (Figs. 1 and 2). The shaft, furthermore, passes through the lower clearance aperture 48 formed in the wall 49 forming the bottom boundary for the tubular extension 45.

There are a pair of relatively rotatable sealing members in contact with each other and disposed around the shaft. Thus, there is a non-rotary annular member 50 supported on the stationary extension 45, as by the aid of the screws 51. The rotary member 52 is carried on the top of a metal bellows or "Sylphon" 53. The lower end of this "Sylphon" or bellows is attached to a collar 54 fastened to the shaft 12, which supports the collar upon a shoulder 55. A bushing 56 contacts the top surface of the collar 54, and is urged downwardly by the aid of the nut 57 threaded onto the shaft 12. A compression spring 58, extending from the rotary collar 54 to the rotary member 52, urges this member into sealing contact with the non-rotary member 50. A supplemental heavy liquid seal 59, such as mercury or carbon tetrachloride, is disposed inside of the relatively rotary members 50, 52. This liquid 59 fills the "Sylphon" or metal bellows 53 and extends downwardly to the top surface of the collar 54.

It is apparent that the top surface 60 of the supplemental sealing liquid is exposed to the water 13 in the well. The space externally of the metal bellows 53 within the extension 45 is in communication with the oil 36 in the enclosed casing through the clearance aperture 48.

The sealing surfaces 61 are formed by a narrow tapered or conical surface on each part. This form of seal provides a rather narrow surface of contact with its inherent advantages. In addition, it has the effect of maintaining proper contact between the sealing surfaces, even after prolonged wear. The conical sealing surfaces 61 have a self-aligning effect.

Under certain load conditions, transverse flexure of the shaft 12 is possible. Such flexure may be of such extent as to disturb the accuracy of the contact between the rotary and non-rotary members 52, 50. In order to guard against such an occurrence, a comparatively large annular clearance space 62 is provided between the shaft 12 and the rotary seal member 52, by spacing the inner surface of the latter transversely from the shaft to a considerable extent. Because of the flexibility of the metal bellows 53, the shaft 12 can flex transversely without imparting such transverse motion to the rotary seal member 52, which might otherwise lose effective sealing contact with the non-rotary seal member 50.

Figure 3:
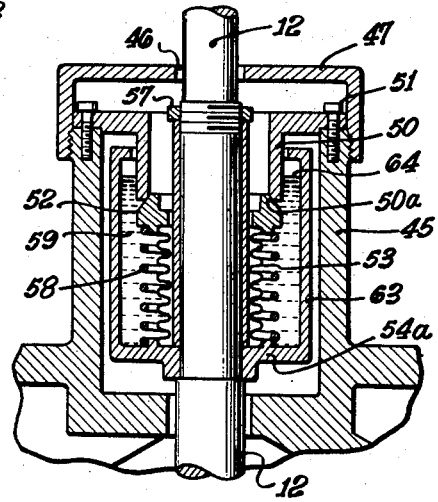
Fig. 3 is a view similar to Fig. 2, disclosing a modified form of seal structure.

In the form of the invention illustrated in Fig. 3, the shaft 12 extending out of the enclosing casing carries a rotary cup member 63. The casing has the tubular extension, from the top edge of which extends downwardly the annular non-rotary sealing member 50. The lower edge 50a of this member may be formed as a tapered sealing surface contacted by the tapered rotary sealing member 52. This sealing member 52 is supported on a metal bellows 53, and is urged, as by the compression spring 58, into sealing contact with the non-rotary member 50. The lower ends of the metal bellows 53 are fastened to the collar portion 54a of the rotary cup 63, which is suitably affixed to the shaft 12. The lower end of the compression spring 58 also bears against this collar portion 54a.

Mercury 59, providing a heavy sealing liquid, is disposed within the cup 63 and has a level 64 sufficiently high as to overlap the sealing surfaces 50a, as disclosed in Fig. 3. The surface 64 of this sealing liquid is in contact with the liquid filling 36 of the casing 18.

In both forms of the invention, a multiple seal is provided. The sealing contact between the rotary and non-rotary sealing members 52, 50 prevents the well fluid 13 from entering the motor casing structure 18 and commingling with the liquid filling 36 in the latter. This seal action is supplemented by the heavy sealing liquid 59 in both forms of the invention disclosed. In Fig. 2, the heavy sealing liquid prevents the well fluid 13 from contacting the surfaces 61 of the rotary and non-rotary sealing members 52, 50; whereas in the form of invention disclosed in Fig. 3, the heavy sealing liquid prevents the filling 36 in the motor casing from contacting the co-engaging sealing surfaces. In both instances, any leakage of fluid that might tend to occur through the co-engaging sealing surfaces is prevented from passing entirely through the sealing structure by the heavy sealing liquid 59.

In view of the pressure that can be maintained in the motor casing 18 on the liquid filling 36, the rotary sealing member 52 is urged more firmly into sealing engagement with the non-rotary sealing member 50. The pressure of the liquid on the outer undersurface of the rotary sealing member 52 forces such member upwardly against the annular seat 61 on the non-rotary sealing member. Thus, the sealing force provided by the metal bellows 53 and the helical spring 58 is supplemented by the pressure of the liquid 36 within the motor casing.

The character of the contacting surfaces in connection with all of the seals illustrated in the various modifications is of importance. In some instances one of the two relatively rotary members 50 or 52 may be made from a metal which forms a mercury amalgam, such as copper. The liquid seal 59, being in the form of a body of mercury, reacts with the metal and forms an amalgam that acts somewhat as an oil film. The effect of providing the amalgam at the contacting surfaces 61 is to smooth out any inequalities thereof.

Also, in some instances, the character of the materials in contact between the rotary and non-rotary sealing members may be purposely chosen for durability and smoothness, and capability of retaining the required high degree of smoothness for extended periods of operation. As examples of the character of these contacting surfaces, may be mentioned bronze or steel, hardened as by carburizing. The steel may be hardened, in addition, as by nitriding it.

As a substitute for the nitrided steel, chromium plated surfaces may be used for one of the sealing surfaces 61. The other sealing surface may also be chromium plated steel, bronze, or even nitrided steel. The important feature is that at least one of the two surfaces is provided with a comparatively hard wearing layer formed as by nitriding, hardening, carburizing or plating.

Optionally one of the two relatively rotary members 50 or 52 may be made of a metal which forms a mercury amalgam, and the other may be made of a material having greater durability and wear-resistant characteristics, such as carburized bronze or carburized and/or nitrided steel. In such arrangement, the advantages of the hard-wearing materials are achieved, yet achieving the advantages of the mercury amalgam.

The inventor claims:

1. In a submersible structure: a casing; a rotary shaft extending from the casing; a non-rotary member surrounding the shaft; and a rotary member carried by the shaft and in annular contact with the non-rotary member; one of said members having its area of contact formed by nitrided steel; and the other contacting area being formed by chromium plated steel.

2. In a submersible structure: a casing; a rotary shaft extending from the casing; a non-rotary member surrounding the shaft; and a rotary member carried by the shaft and in annular contact with the non-rotary member; said members having coengaging metallic areas of contact; and mercury overlapping the area of contact to form a mercury amalgam with the metal of said members at said area of contact.

3. In a submersible structure: a casing; a rotary shaft extending from the casing; a non-rotary member surrounding the shaft; a rotary member carried by the shaft and in annular contact with the non-rotary member; said members having metallic areas of contact with at least one of said members containing copper at said area of contact; and mercury overlapping said area of contact to form a mercury copper amalgam at said area of contact.

4. In a submersible structure: a casing; a rotary shaft extending from the casing; a non-rotary member surrounding the shaft; a rotary member carried by the shaft and in annular contact with the non-rotary member; one of the members at the area of contact being of a material that forms an amalgam with mercury; and mercury overlapping the area of contact to form a mercury amalgam at said area of contact of said one member.

5. The combination as set forth in claim 4 in which the other member at the area of contact is of a material of greater durability than the material at said area of contact of said one member.

6. The combination as set forth in claim 4 in which the other member at the area of contact is of carburized steel.

7. The combination as set forth in claim 4 in which the other member at the area of contact is of bronze.

8. The combination as set forth in claim 4 in which the other member at the area of contact is of carburized and nitrided steel.

References Cited in the file of this patent

UNITED STATES PATENTS

| | | |
|---|---|---|
| 343,923 | Schinneller | June 15, 1886 |
| 1,835,877 | Joyce | Dec. 8, 1931 |
| 2,149,975 | McCormack | Mar. 7, 1939 |
| 2,297,477 | Hahn et al. | Sept. 29, 1942 |
| 2,318,181 | Myers | May 4, 1943 |
| 2,381,615 | Myers | Aug. 7, 1945 |